(12) United States Patent
Yamauchi et al.

(10) Patent No.: US 9,384,050 B2
(45) Date of Patent: Jul. 5, 2016

(54) SCHEDULING METHOD AND SCHEDULING SYSTEM FOR MULTI-CORE PROCESSOR SYSTEM

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 14/020,178

(22) Filed: Sep. 6, 2013

(65) Prior Publication Data
US 2014/0007131 A1    Jan. 2, 2014

Related U.S. Application Data

(63) Continuation of application No. PCT/JP2011/055416, filed on Mar. 8, 2011.

(51) Int. Cl.
*G06F 9/50* (2006.01)
*G06F 9/46* (2006.01)

(52) U.S. Cl.
CPC . *G06F 9/50* (2013.01); *G06F 9/505* (2013.01)

(58) Field of Classification Search
None
See application file for complete search history.

(56) References Cited

U.S. PATENT DOCUMENTS

| 2005/0188087 | A1 | 8/2005 | Iyoda |
| 2009/0119673 | A1* | 5/2009 | Bubba ........................... 718/104 |
| 2009/0144393 | A1* | 6/2009 | Kudo ................... G06F 9/5044 709/218 |
| 2011/0161973 | A1* | 6/2011 | Klots et al. .................... 718/104 |

FOREIGN PATENT DOCUMENTS

| JP | 62-027856 | 2/1987 |
| JP | 7-152698 | 6/1995 |
| JP | 9-212467 | 8/1997 |
| JP | 2000-268012 | 9/2000 |
| JP | 2005-284966 | 10/2005 |
| WO | WO 03/100648 | 12/2003 |

OTHER PUBLICATIONS

International Search Report mailed Apr. 12, 2011 in corresponding International Application No. PCT/JP2011/055416.
H. Kasahara, "Parallel Processing Technology," Corona Publishing Co., Ltd., 1991, pp. 156-157.
(Continued)

*Primary Examiner* — Eric C Wai
(74) *Attorney, Agent, or Firm* — Staas & Halsey LLP

(57) ABSTRACT

A scheduling method is executed by a first CPU and a second CPU. The scheduling method includes acquiring by the first CPU and when a first application is invoked, a first threshold for executing the first application; transmitting by the first CPU, a first threshold to the second CPU; and giving notification to the first CPU by the second CPU when an execution capability of the second CPU is greater than or equal to the first threshold, the notification indicating that the second CPU can execute the first application. The second CPU does not give notification to the first CPU when the execution capability of the second CPU is less than the first threshold.

9 Claims, 7 Drawing Sheets

(56) References Cited

OTHER PUBLICATIONS

H. Yamamoto et al., "Investigation and fundamental analysis of process allocation scheme on Grid computing environment," *IEICE Technical Report*, vol. 102, No. 60, 2002, pp. 43-48.

Japanese International Preliminary Report on Patentability mailed Sep. 19, 2013 in corresponding International Patent Application No. PCT/JP2011/055416.

Japanese Office Action issued Dec. 16, 2014 in Japanese Patent Application No. 2013-503286.

* cited by examiner

APPLICATION TABLE — 300

| APP ID | $L_{min}$ | $L_{max}$ | m | |
|---|---|---|---|---|
| AP1 | 0.1 | 0.7 | 2 | 300-1 |
| AP2 | 0.3 | 0.5 | 5 | |
| ⋮ | ⋮ | ⋮ | ⋮ | |
| APK | ... | ... | ... | 300-K |

FIG.5

FIRST RESPONSE NOTIFICATION LIST — 500

| HIGHEST LOAD | CPU NAME | ASSIGNMENT FLAG | |
|---|---|---|---|
| 0.7 | CPU #2 | 0 | 500-1 |
| | CPU #4 | 0 | 500-2 |
| | CPU #5 | 0 | 500-3 |
| | ⋮ | ⋮ | |

FIG.6

SECOND RESPONSE NOTIFICATION LIST — 600

| LOWEST LOAD | CPU NAME | SURPLUS COMPUTING CAPACITY | |
|---|---|---|---|
| 0.1 | CPU #3 | 0.3 | 600-1 |
| | CPU #6 | 0.2 | 600-2 |
| | CPU #7 | 0.6 | 600-3 |
| | ⋮ | ⋮ | |

THREAD LOAD INFORMATION — 700

| THREAD ID | LOAD |
|---|---|
| t1 | 0.3 |
| t2 | 0.45 |
| t3 | 0.5 |
| t4 | 0.35 |
| t5 | 0.4 |

SCHEDULING METHOD AND SCHEDULING SYSTEM FOR MULTI-CORE PROCESSOR SYSTEM

CROSS REFERENCE TO RELATED APPLICATIONS

This application is a continuation application of International Application PCT/JP2011/055416, filed on Mar. 8, 2011 and designating the U.S., the entire contents of which are incorporated herein by reference.

FIELD

The embodiment discussed herein is related to a scheduling method and a scheduling system.

BACKGROUND

In embedded systems such as mobile terminals, multi-core processors and many-core processors equipped with multiple cores are being adopted. In multi-core and many-core systems, when a new application is invoked, for example, a processor that performs scheduling collects load information for each of the processors in the system, determines a processor to which the application is to be assigned, and dispatches the application.

Related technology includes technology that calculates the time consumed until the application is dispatched. Further, among information processing systems, technology is present that monitors the state of surplus processing capacity at an agent system and causes an agent system having surplus capacity to execute a job.

In client server systems, servers weight central processing unit (CPU) load, job priority, counts of jobs to be executed, etc., assign a threshold, and compare the threshold and load information to thereby judge load. Further, a master computing device receives load information for each computing device, evaluates surplus capacity, selects the computing device with the greatest surplus capacity, and causes the selected device to execute a job.

For examples, refer to Japanese Laid-Open Patent Publication Nos. 2005-284966, 2000-268012, and H9-212467; and Kasahara, Hironori, "Parallel Processing Technology", Corona Publishing Co., Ltd., 1991, p. 156.

Nonetheless, with the conventional technologies, a problem arises in that the time consumed for application scheduling in multi-core and many-core embedded systems increases. For example, if the number of cores or the period of communication between cores increases, the time consumed until the completion of application dispatch may exceed the dispatch cycle prescribed by the specifications, resulting in a performance bottleneck.

SUMMARY

According to an aspect of an embodiment, a scheduling method is executed by a first CPU and a second CPU. The scheduling method including acquiring by the first CPU and when a first application is invoked, a first threshold for executing the first application; transmitting by the first CPU, a first threshold to the second CPU; and giving notification to the first CPU by the second CPU when an execution capability of the second CPU is greater than or equal to the first threshold, the notification indicating that the second CPU can execute the first application. The second CPU does not give notification to the first CPU when the execution capability of the second CPU is less than the first threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram depicting an example of a first response notification list;

FIG. 6 is a diagram depicting an example of a second response notification list;

DESCRIPTION OF EMBODIMENTS

Preferred embodiments of a scheduling method and a scheduling system will be explained in detail with reference to the accompanying drawings. In the present embodiments, the scheduling system is a multi-core system that includes a multi-core processor equipped with multiple cores. Provided that multiple cores are provided, the multi-core processor may be a single processor equipped with multiple cores or a group of single-core processors in parallel. In the present embodiment, to simplify the description, description will be given taking a group of single-core processors in parallel as an example.

Figure 1:
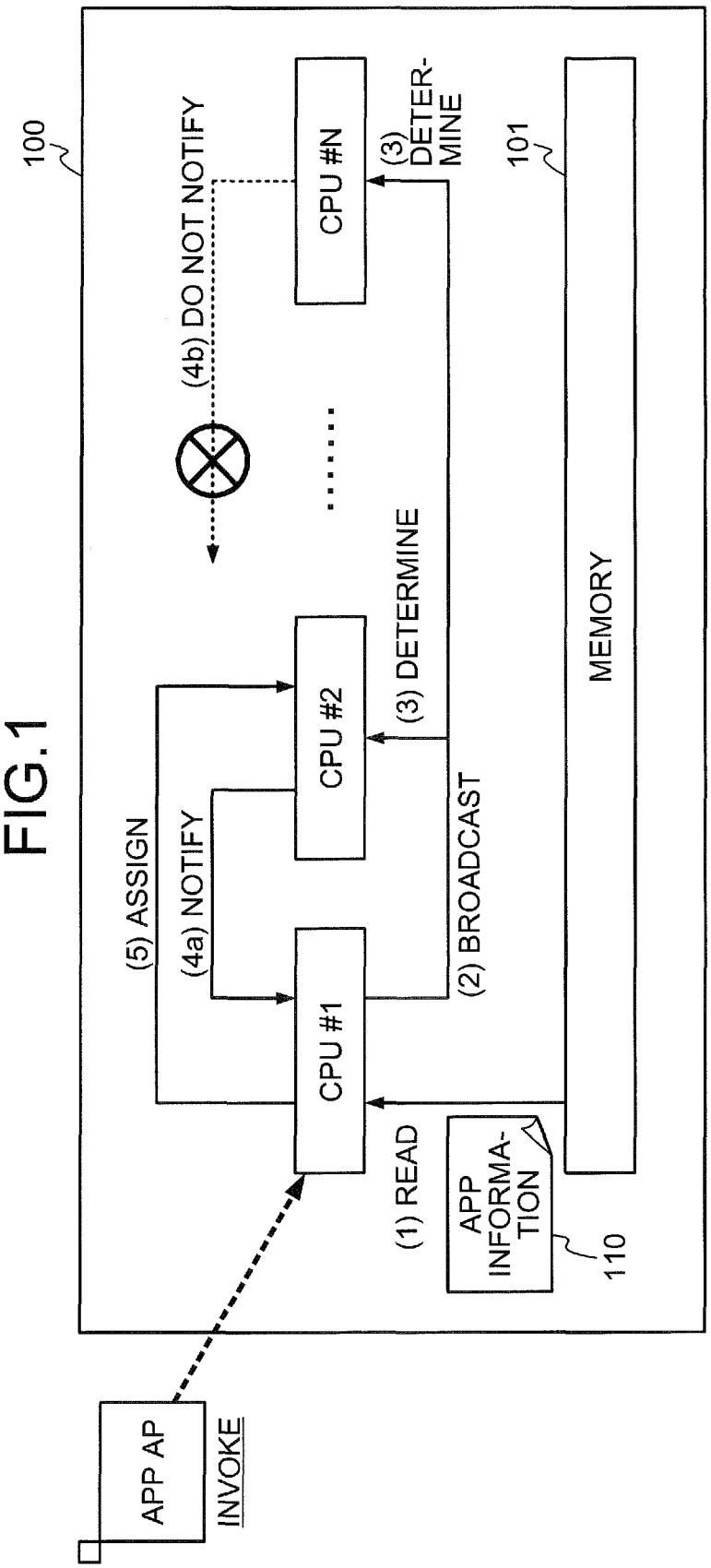
FIG. 1 is a diagram depicting an example of a scheduling method according to an embodiment.

FIG. 1 is a diagram depicting an example of the scheduling method according to the embodiment. As depicted in FIG. 1, a multi-core system 100 is a scheduling system that includes CPUs #1 to #N, and memory 101.

The CPU #1 is a master CPU and governs overall control of the multi-core system 100. The CPU #1 further controls the assignment of applications to CPUs and executes assigned applications. The CPUs #2 to #N are slave CPUs and execute assigned applications. The memory 101 is memory shared by the CPUs #1 to #N.

Here, an example will be described of a scheduling process that is executed by the multi-core system 100 when an application is invoked.

(1) The CPU #1 reads from the memory 101, app information 110 that is for executing an application AP when the application AP ("APP" in FIG. 1) is invoked. In this example, the app information 110 is information indicating a count of the threads included in the application AP, the execution capability that is required of a the CPU in order to execute the application AP.

(2) The CPU #1 broadcasts the app information 110 to the CPUs #2 to #N.

(3) Each of the CPUs #2 to #N determines based on the app information 110, whether the CPU #2 to #N can execute the application AP. For example, the CPUs #2 to #N compare the respective execution capabilities thereof and the execution capability indicated (by the app information 110) to be required for the execution of the application AP, and determine whether the application AP can be executed thereby.

(4a) If the application AP can be executed, the CPUs #2 to #N notify the CPU #1 as such. For example, if the execution capability of a CPU #2 to #N is greater than or equal to the execution capability required for the execution of the application AP, the CPU #2 to #N notifies the CPU #1 that the application AP can be executed thereby.

In the example depicted in FIG. 1, the execution capability of the CPU #2 is greater than or equal to the execution capability required for the execution of the application AP and therefore, the CPU #2 notifies the CPU #1 that the application AP can be executed by the CPU #2.

(4b) If the application AP cannot be executed, the CPUs #2 to #N do not give to the CPU #1, notification related to the executability of the application AP. For example, if the execution capability of a CPU #2 to #N is less than the execution capability required for the execution of the application AP, the CPU #2 to #N does not give to the CPU #1, notification related to the executability of the application AP.

In the example depicted in FIG. 1, the execution capability of the CPU #N is less than the execution capability required for the execution of the application AP and therefore, notification related to the executability of the application AP is not given to the CPU #1 from the CPU #N ("no notification" in FIG. 1).

(5) The CPU #1 assigns the application AP to a CPU (e.g., CPU #2) that has given notification that the application AP be executed thereby. Consequently, for example, the application AP is executed by the CPU #2 to which the application AP is assigned.

Thus, according to the multi-core system 100, the executability of a newly invoked application AP can be determined by the CPUs #2 to #N. As a result, compared to a case where the CPU #1 alone determines executability by the CPUs #2 to #N, the load of the CPU #1 at the time of scheduling can be reduced. Further, since load information (execution capability) of the CPUs #2 to #N is not aggregated at the CPU #1 when scheduling is performed, communication conflict can be prevented at the CPU #1.

According to the multi-core system 100, the app information 110 for executing the newly invoked application AP can be acquired from the memory 101 by the CPU #1 and broadcast to the CPUs #2 to #N. As a result, contention consequent to the CPUs #2 to #N accessing the same data on the memory 101 can be prevented. In other words, when the CPUs #2 to #N determine whether the application AP can be executed, the app information 110 does not have to be read from the memory 101 by the CPUs #2 to #N, respectively and therefore, contention in accessing the app information 110 on the memory 101 can be prevented.

According to the multi-core system 100, among the CPUs #2 to #N, only the CPUs (e.g., the CPU #2) capable of executing the application AP reply to the CPU #1, thereby enabling communication conflict at the CPU #1 to be prevented when scheduling is performed.

Thus, the multi-core system 100 enables the communication cost at the time of scheduling to be reduced and efficient scheduling to be performed.

Next, a system configuration of the multi-core system 100 according to the embodiment will be described.

Figure 2:
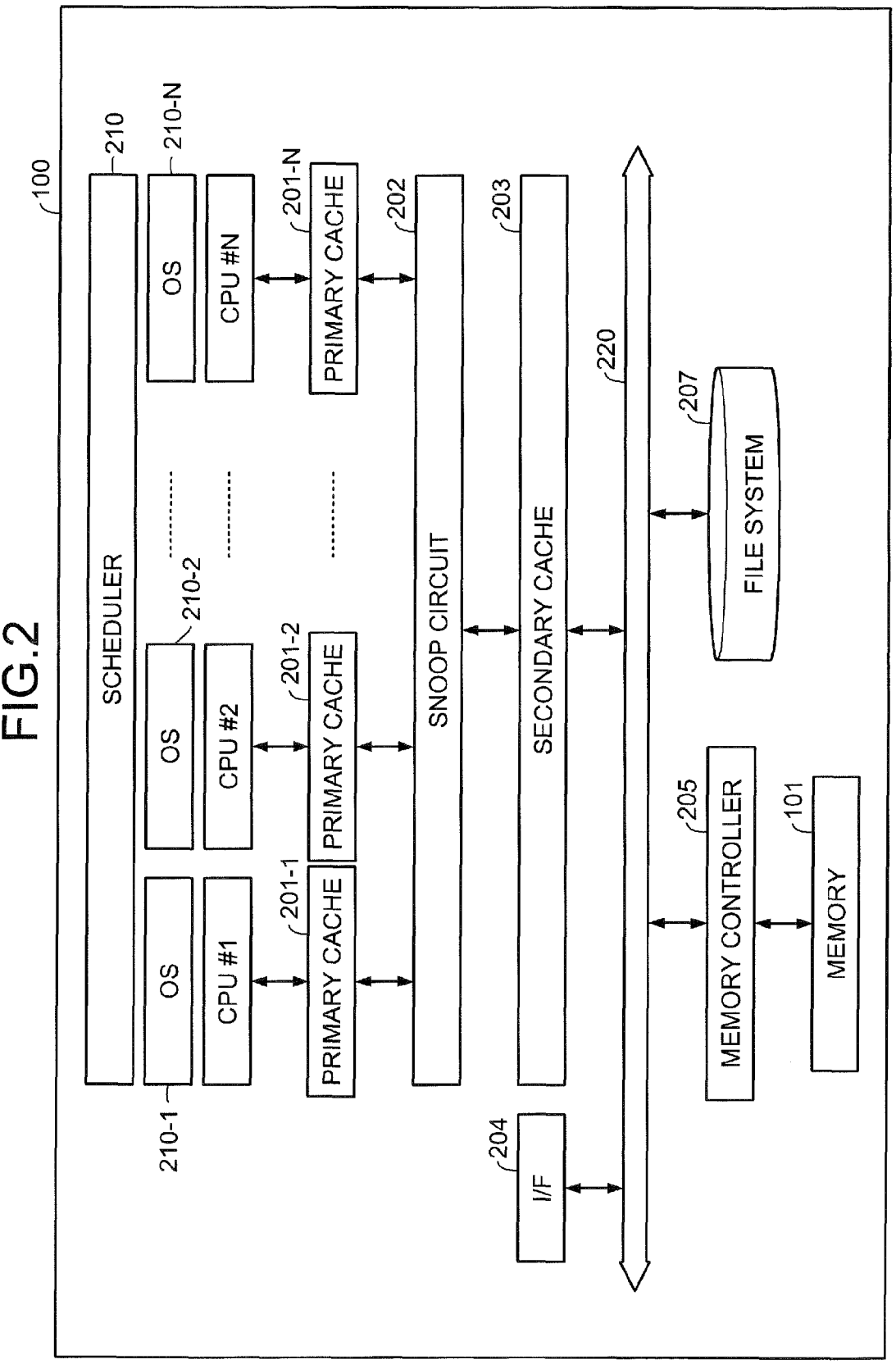
FIG. 2 is a diagram depicting an example of a system configuration of a multi-core system according to the embodiment.

FIG. 2 is a diagram depicting an example of a system configuration of the multi-core system according to the embodiment. As depicted in FIG. 2, the multi-core system 100 has the CPUs #1 to #N, the memory 101, primary caches 201-1 to 201-N, a snoop circuit 202, a secondary cache 203, and interface (I/F) 204, and a memory controller 205. In the multi-core system 100, the secondary cache 203, the I/F 204, and the memory controller 205 are connected by a bus 220. Further, the memory 101 is connected to the respective components via the memory controller 205.

The CPU #1 executes an operating system (OS) 210-1 and governs overall control of the multi-core system 100. The OS 210-1 is a master OS and includes a scheduler 210 that controls the assignment of applications to the CPUs. Further, the CPU #1 executes assigned applications. The CPUs #2 to #N respectively execute OSs #210-2 to 210-N and applications assigned to the OSs. The OSs #210-2 to 210-N are slave OSs.

The CPUs #1 to #N respectively have a register and a core. Each register has a program counter and a reset register. Further, the CPUs #1 to #N are connected to respective components via the primary caches 201-1 to 201-N, the snoop circuit 202, and the secondary cache 203.

The primary caches 201-1 to 201-N respectively have cache memory and a cache controller. For example, the primary cache 201-1 temporarily stores writing to the memory 101 from an application executed by the OS 210-1. The primary cache 201-1 temporarily stores data read from the memory 101.

The snoop circuit 202 maintains coherency of the primary caches 201-1 to 201-N accessed by the CPUs #1 to #N. For example, if data common among the primary caches 201-1 to 201-N is updated at one of the primary caches 201-1 to 201-N, the snoop circuit 202 updates the data at the other primary caches.

The secondary cache 203 has cache memory and a cache controller. The secondary cache 203 stores data cleared from the primary caches 201-1 to 201-N. For example, the secondary cache 203 stores data shared by the OSs 210-1 to 210-N.

The I/F 204 is connected, via a communication line, to a network such as a local area network (LAN), a wide area network (WAN), and the Internet. The I/F 204 administers an internal interface with the network and controls the input and output of data with respect to external devices.

The memory controller 205 controls the reading and writing of data with respect to the memory 101. The memory 101 is memory shared by the CPUs #1 to #N and includes, for example, read-only memory (ROM), random access memory (RAM), flash ROM, etc.

For example, the flash ROM stores each OS program; the ROM stores application programs; and the RAM is used as a work area of the CPUs #1 to #N. Programs stored in the memory 101 are loaded to the CPUs, whereby encoded processes are executed by the CPUs.

A file system 207, for example, stores application command code as well as content data such as images and video. The file system 207 is an auxiliary storage device such as a hard disk or an optical disk. Although not depicted, the multi-core system 100 may further have a display, a keyboard, etc. in addition to a power management unit (PMU) that supplies source voltage to each of the components.

Next, the contents of an application table 300 that is accessed by the master CPU (CPU #1) will be described. The application table 300, for example, is stored in the memory 101 depicted in FIG. 2.

Figures 3, 4:
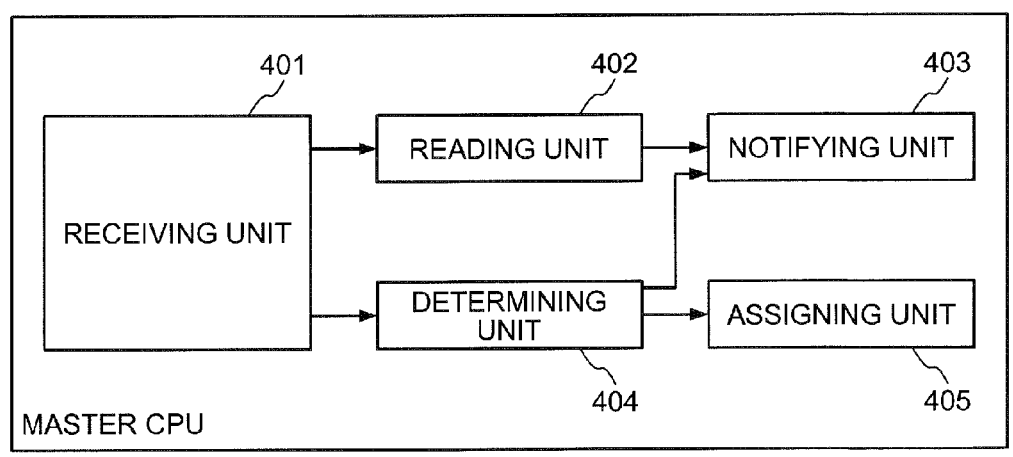
FIG. 3 is a diagram of an example of the contents of an application table.
FIG. 4 is a functional diagram of a master CPU according to the embodiment.

FIG. 3 is a diagram of an example of the contents of an application table. As depicted in FIG. 3, the application table 300 has fields for an app ID, $L_{min}$, $L_{max}$, and m. Information is set into each of the fields, whereby the information is stored as app information records 300-1 to 300-K, respectively corresponding to applications AP1 to APK.

In this example, an app ID is an identifier of the applications AP1 to APK. $L_{min}$ is the load of the thread for which the load is lowest among 1 or more thread groups included in each of the applications AP1 to APK. The load of a thread is the load placed on the CPU in order to execute the thread. $L_{max}$ is the load of the thread for which the load is highest among the 1 or more thread groups of included in each of the applications AP1 to APK. "m" is a thread count of the threads included in each of the applications AP1 to APK.

In the description, the maximum computing capacity, the surplus computing capacity and the load of a CPU, and the load of a thread are expressed by values that are set or calculated according to uniform standards of value. In this example, the maximum computing capacity of the CPU #1, which is the master CPU, is "1.0". Further, the maximum computing capacity of each of the CPUs #2 to #N, which are slave CPUs, is set on the basis of the operation frequency of the CPU #1.

For example, if the operation frequency of the CPU #2 is identical to the operation frequency of the CPU #1, the maximum computing capacity of the CPU #2 is "1.0"; and if the operation frequency of the CPU #2 is twice the operation frequency of the CPU #1, the maximum computing capacity of the CPU #2 is "2.0". Further, for example, if the operation frequency of the CPU #2 is half the operation frequency of the CPU #1, the maximum computing capacity of the CPU #2 is "0.5".

The load of a CPU is expressed by the proportion of the given interval, the processing period of the CPU occupies. For example, if the CPU #1 constantly performs a process during a given interval, the load of the CPU #1 is "1.0". Further, if the CPU #1 is in an idle state during half of the given interval, the load of the CPU #1 is "0.5".

The surplus computing capacity of a CPU is the difference of the maximum computing capacity of the CPU less the load of the CPU. In other words, the surplus computing capacity of the CPU indicates the remaining computing capacity of the CPU. For example, if the load of the CPU #1 is "0.5", the surplus computing capacity of the CPU #1 is "0.5".

Here, taking the app information record 300-1 as an example, the lowest load $L_{min}$ of a thread included in the application AP1 is "0.1", the highest load $L_{max}$ is "0.7", and the thread count m is "2". In other words, in order for a CPU having a maximum computing capacity identical to that of the CPU #1 to execute the thread having the lowest load $L_{min}$ "0.1", the surplus computing capacity of the CPU has to be "0.1 or greater". Similarly, to execute the thread having the highest load $L_{max}$ "0.7", the surplus computing capacity of the CPU has to be "0.7 or greater".

In the description hereinafter, an arbitrary application among the applications AP1 to APK is indicated as "application APk" (k=1, 2, . . . , K). Further, the lowest load of a thread included in the application APk is indicated as "the lowest load $Lk_{min}$", the highest load is indicated as "the highest load $Lk_{max}$", and the thread count is indicated as "the thread count mk".

Next, an example of a functional configuration of the master CPU (CPU #1) will be described. FIG. 4 is a functional diagram of the master CPU according to the embodiment. As depicted in FIG. 4, the master CPU includes a receiving unit 401, a reading unit 402, a notifying unit 403, a determining unit 404, and an assigning unit 405. Function of the units (the receiving unit 401 to the assigning unit 405), for example, are implemented by executing on the CPU #1, the scheduler 210 that is stored in the memory 101. Processing results obtained by the units, for example, are stored to a storage device such as the register of the CPU #1, the primary cache 201-1, the secondary cache 203, and the memory 101.

The receiving unit 401 receives a new invocation request for an application APk. The invocation request for the application APk, for example, includes the app ID of the application APk. For example, the receiving unit 401 receives the invocation request for the application APk from the OS 210-1.

The reading unit 402, when the invocation request for the application APk is received, reads from the memory 101, a threshold related to the CPU computing capacity for executing the application APk. Here, a threshold related to the CPU computing capacity is, for example, the load placed on a CPU to execute a thread included in the application APk. Further, for example, a threshold related to the CPU computing capacity is the lowest load $Lk_{min}$ or the highest load $Lk_{max}$ among the threads included in the application APk.

For example, the reading unit 402 accesses the memory 101 and reads from the application table 300, the app information record 300-k that corresponds to the app ID of the application APk included in the invocation request.

The app information record 300-k includes the lowest load $Lk_{min}$ and the highest load $Lk_{max}$ among the threads of the application APk.

The notifying unit 403 notifies the CPUs #2 to #N of the threshold related to the CPU computing capacity for executing the application APk. For example, the notifying unit 403 broadcasts to the CPUs #2 to #N, the lowest load $Lk_{min}$ and the highest load $Lk_{max}$ identified from the app information record 300-k.

The receiving unit 401, consequent to the threshold related to the CPU computing capacity for executing the application APk being given to the CPUs #2 to #N, receives from a CPU #j (j=2, 3, . . . , N), a response indicating that the application APk can be executed thereby. For example, the receiving unit 401 receives a first response notification or a second response notification from the CPU #j.

Here, a first response notification is a response indicating that in the application APk, the thread having the highest load $Lk_{max}$ can be executed. In other words, the first response notification indicates that any thread included in the application APk can be executed by the CPU #j.

A second response notification is a response indicating that in the application APk, the thread having the lowest load $Lk_{min}$ can be executed. In other words, the second response notification indicates that among the thread groups included in the application APk, at least the thread having the lowest load $Lk_{min}$ can be executed by the CPU #j. The second response notification, for example, further includes information indicating the surplus computing capacity of the CPU #j.

First response notifications that are received, for example, are stored to a first response notification list 500 depicted in FIG. 5. Second response notifications that are received, for example, are stored to a second response notification list 600 depicted in FIG. 6. The first and the second response notification lists 500 and 600, for example, are implemented by a storage device such as the register of the CPU #1, the primary cache 201-1, the secondary cache 203, and the memory 101. An example of the first response notification list 500 will be described.

FIG. 5 is a diagram depicting an example of the first response notification list. In FIG. 5, the first response notification list 500 is information that indicates in a list-form, CPU information (for example, CPU information records 500-1 to 500-3) for each CPU from which there is a first response notification, which indicates that the thread having the highest load $Lk_{max}$ in the application APk can be executed.

Here, the highest load is the highest load $Lk_{max}$ among the threads included in the application APk for which there is an invocation request. In the example depicted in FIG. 5, the highest load $L1_{max}$ among the threads included in the application AP1 is indicated to be "0.7". The CPU name is an identifier of the CPU from which there is a first response notification.

An assignment flag is a flag that indicates an assignment state of the CPU from which there is a first response notification. The value of assignment flag is "0" if no thread of the application APk has been assigned to the CPU, and is "1" if a thread of the application APk has been assigned to the CPU. In the initial state, the value of the assignment flag is "0".

Taking the CPU information record 500-1 as an example, the CPU name "CPU #2" of the CPU from which there is a first response notification indicating that the thread having the highest load $L1_{max}$ "0.7" in the application AP1 can be executed and the assignment flag "0" are indicated. The CPU information record 500-1 is created and registered into the first response notification list 500, if there is a first response notification from the CPU #2.

Next, an example of the second response notification list 600 will be described.

FIG. 6 is a diagram depicting an example of the second response notification list. In FIG. 6, the second response notification list 600 is information that indicates in a list-form, CPU information (for example, CPU information records 600-1 to 600-3) for each CPU from which there is a second response notification, which indicates that the thread having the lowest load $Lk_{min}$ in the application APk can be executed.

Here, the lowest load is the lowest load $Lk_{min}$ among the threads that are included in the application APk for which there is an invocation request. In the example depicted in FIG. 6, the lowest load $L1_{min}$ among the threads included in the application AP1 is indicated to be "0.1". The CPU name is an identifier of the CPU from which there is a second response notification. The surplus computing capacity is the surplus computing capacity of the CPU from which there is a second response notification.

Taking the CPU information record 600-1 as an example, the CPU name "the CPU #3" of the CPU from which there is a second response notification indicating that the thread having the lowest load $L1_{min}$ "0.1" in the application AP1 can be executed and the surplus computing capacity "0.3" are indicated. The CPU information record 600-1 is created and registered into the second response notification list 600, if there is a second response notification from the CPU #3.

The contents of the first response notification list 500 and of the second response notification list 600, for example, are initialized each time the lowest load $Lk_{min}$ and the highest load $Lk_{max}$ among the threads in the application APk are broadcast to the CPUs #2 to #N.

The reference of the description returns to FIG. 4, the determining unit 404 determines if the number of CPUs from which a response has been received that indicates that the application APk can be executed is greater than or equal to the thread count mk of the threads included in the application APk. The thread count mk is identified from the invocation request for the application APk.

For example, the determining unit 404 determines if the number of the CPUs (hereinafter, "CPU count X") for which there is a first response notification, which indicates that the thread having the highest load $Lk_{max}$ in the application APk, is greater than or equal to the thread count mk (hereinafter, "first determination process").

For example, the determining unit 404 refers to the first response notification list 500 depicted in FIG. 5, and by counting the CPU information records in which the assignment flag is "0", calculates the CPU count X of the CPUs from which there is a first response notification. The determining unit 404 determines if the calculated CPU count X is greater than or equal to the thread count mk of the threads included in the application APk.

The determining unit 404 determines if the number of CPUs (hereinafter, "CPU count Y") from which there is a second response notification, which indicates that the thread having the lowest load $Lk_{min}$ in the application APk can be executed, is greater than or equal to the thread count mk.

For example, the determining unit 404 refers to the second response notification list 600 depicted in FIG. 6, and by counting the CPU information records, calculates the CPU count Y of the CPUs from which there is a second response notification. The determining unit 404 determines if the calculated CPU count Y is greater than or equal to the thread count mk of the threads included in the application APk.

For example, even if a given period T elapses from when notification of the lowest load $Lk_{min}$ and the highest load $Lk_{max}$ of the threads is given, a second determination process may be executed, if in the first determination process, the CPU count X is determined to be less the thread count mk. The given period T, for example, is preliminarily set and stored in a storage device such as the register of the CPU #1, the primary cache 201-1, the secondary cache 203, and the memory 101.

The assigning unit 405, based on the determination result, assigns a thread group included in the application APk to the CPUs #2 to #N. For example, the assigning unit 405 assigns a thread included in the application APk to a CPU #j from which there is a response indicating that the application APk can be executed.

Here, process details of the scheduling method by the master CPU (CPU #1) will be described.

First, a scheduling method 1 of the master CPU (CPU #1) will be described. The scheduling method 1 is a method of assigning threads included in the application APk, based on the determination result of the first determination process.

The assigning unit 405, if the CPU count X is greater than or equal to the thread count mk (first determination process), refers to the first response notification list 500 and randomly assigns a thread group included in the application APk, to the CPUs for which the value of the assignment flag is "0". "Randomly assigning a thread" is the assignment of a thread by selecting a CPU and assigning the thread to the CPU, where the CPU is selected based on an arbitrary selection algorithm and from among a CPU group serving as a parent population.

Thus, a thread group included in the application APk can be assigned to a CPU #j whose surplus computing capacity is greater than or equal to the highest load $Lk_{max}$. If a thread of the application APk is assigned to a CPU #j, the value of the assignment flag of the CPU #j is changed from "0" to "1" in the first response notification list 500.

On the other hand, if the CPU count X is less than the thread count mk (first determination process), the assigning unit 405 randomly assigns a thread group included in the application APk to the CPUs #2 to #N. In this case, the assigning unit 405 may preferentially select from among the CPUs #2 to #N, the CPUs whose assignment flag in the first response notification list 500 is "0", and assign threads of the application APk thereto.

Thus, a CPU #j whose surplus computing capacity is greater than or equal to the highest load $Lk_{max}$ can be preferentially selected from among the CPUs #2 to #N and a thread included in the application APk can be assigned thereto.

Further, the assigning unit 405 may assign to the preferentially selected CPU whose assignment flag in the first response notification list 500 is "0", a thread having a high load in the application APk. Here, the load of each thread in the application APk, for example, is identified from thread load information of the application APk.

Thread load information of the application APk, for example, is associated with the app information record 300-k of the application APk depicted in FIG. 3 and is stored to the memory 101. Here, an example of the thread load information will be described.

Figures 7, 8:
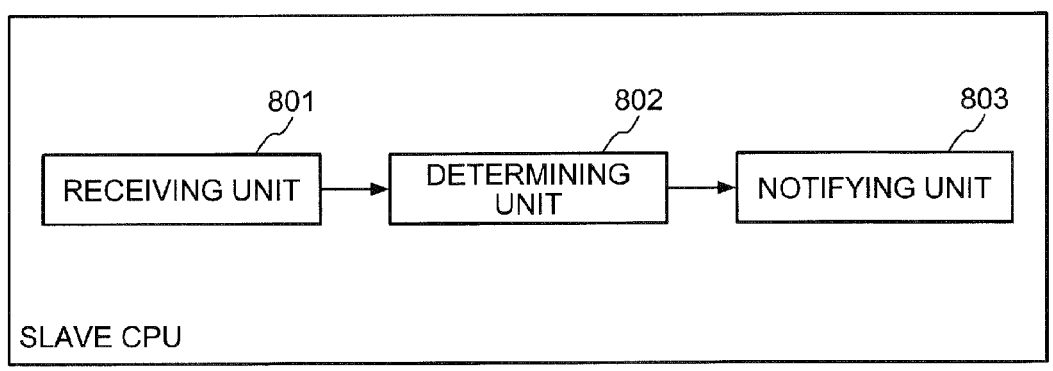
FIG. 7 is a diagram depicting an example of thread load information.
FIG. 8 is a functional diagram of slave CPUs according to the embodiment.

FIG. 7 is a diagram depicting an example of the thread load information. In FIG. 7, thread load information 700 is information that indicates the load of each thread t1 to t5 included in the application AP2. For example, the load of a thread t1 is "0.3"; the load of a thread t2 is "0.45"; the load of a thread t3 is "0.5"; the load of a thread t4 is "0.35"; and the load of a thread t5 is "0.4".

In this case, the assigning unit 405 assigns a thread of a high load (for example, the thread t3) to the preferentially selected CPU whose assignment flag in the first response notification list 500 is "0". Thus, a thread of a high load can be assigned to a CPU #j whose surplus computing capacity is greater than or equal to the highest load $Lk_{max}$.

Next, a scheduling method 2 of the master CPU (CPU #1) will be described. The scheduling method 2 is a method of assigning threads included in the application APk, based on the determination result of the second determination process.

The assigning unit 405, if the CPU count Y is greater than or equal to the thread count mk (second determination process), refers to the second response notification list 600 and randomly assigns a thread group included in the application APk, to the CPUs from which there is a second response notification. Thus, a thread group included in the application APk can be assigned to a CPU #j whose surplus computing capacity is greater than or equal to the lowest load $Lk_{min}$.

Further, if the CPU count Y is greater than or equal to the thread count mk (second determination process), the assigning unit 405 may refer to the second response notification list 600 and assign to the CPUs in descending order of surplus computing capacity, threads of high loads in the application APk.

For example, the assigning unit 405 refers to the thread load information 700 and respectively assigns threads of high loads (high:t3→t2→t5→t4→t1:low) to the CPUs in descending order of surplus computing capacity. Thus, a CPU #j whose surplus computing capacity is high can be preferentially selected from among the CPUs whose surplus computing capacities are greater than or equal to the lowest load $Lk_{min}$ and a thread of high load can be assigned to the selected CPU.

On the other hand, if the CPU count Y is less than the thread count mk (second determination process), the assigning unit 405 randomly assigns a thread group included in the application APk to the CPUs #2 to #N. In this case, the assigning unit 405 may refer to the second response notification list 600, preferentially select CPUs from which there is a second response notification, and assign threads of the application APk to the selected CPUs.

Thus, a CPU #j whose surplus computing capacity is greater than or equal to the lowest load $Lk_{min}$ can be preferentially selected from among the CPUs #2 to #N, and threads included in the application APk can be assigned thereto.

Further, the assigning unit 405 may assign to the preferentially selected CPU from which there is a second response notification, a thread having a high load in the application APk. Thus, a thread of a high load can be assigned to a CPU #j whose surplus computing capacity is greater than or equal to the lowest load $Lk_{min}$.

Next, a scheduling method 3 of the master CPU (CPU #1) will be described. The scheduling method 3 is a method of assigning threads included in the application APk, based on the determination result of a third determination process described hereinafter.

After the given period T elapses, if the CPU count X is less than the thread count mk (first determination process), the determining unit 404 determines if the CPU count Y is greater than or equal to a difference of the thread count mk less the CPU count X (third determination process). In the description hereinafter, the difference of the thread count mk less the CPU count X is referred to as "remaining thread count (mk-X)".

If the CPU count Y is greater than or equal to the remaining thread count (mk-X) (third determination process) the assigning unit 405 preferentially selects from among the CPUs #2 to #N, the CPUs whose assignment flag in the first response notification list 500 is "0", and assigns threads of the application APk to the selected CPUs. In this case, the assigning unit 405 may assign to the preferentially selected CPUs, threads of high loads in the application APk.

Next, the assigning unit 405 refers to the second response notification list 600 and assigns to the CPUs from which there is a second response notification, remaining threads that have not been assigned among the thread group of the application APk. In this case, the assigning unit 405 may assign threads of high load to the CPUs in descending order of surplus computing capacity.

Thus, a CPU #j whose surplus computing capacity is greater than or equal to the highest load $Lk_{max}$ can be preferentially selected from among the CPUs #2 to #N, and threads of the application APk can be assigned thereto. Furthermore, the remaining threads can be assigned to a CPU #j whose surplus computing capacity is greater than or equal to the lowest load $Lk_{min}$.

On the other hand, if the CPU count Y is less than the remaining thread count (mk-X) (third determination process), the assigning unit 405 preferentially selects from among the CPUs #2 to #N, the CPUs whose assignment flag in the first response notification list 500 is "0", and assigns threads of the application APk thereto.

Next, the assigning unit 405 refers to the second response notification list 600, preferentially selects CPUs from which there is a second response notification, and assigns thereto the remaining threads that have not been assigned. The assigning unit 405 randomly assigns the remaining threads to the CPUs #2 to #N.

Thus, a CPU #j whose surplus computing capacity is greater than or equal to the highest load $Lk_{max}$ can be preferentially selected from among the CPUs #2 to #N, and threads of the application APk can be assigned thereto. Furthermore, a CPU #j whose surplus computing capacity is greater than or equal to the lowest load $Lk_{min}$ can be preferentially selected and a remaining thread can be assigned thereto. In other words, as far as possible, a thread group of the application APk can be assigned to a CPU #j whose surplus computing capacity is high among the CPUs #2 to #N.

Before the broadcasting of the lowest load $Lk_{min}$ and the highest load $Lk_{max}$ among the threads in the application APk by the notifying unit 403, the determining unit 404 may refer to the first response notification list 500 and execute the first determination process. In other words, the determining unit 404 executes the first determination process for the application APk, using first response notifications related to an application Apr (r≠k) that was assigned before the application APk.

For example, first, the determining unit 404 determines if the highest load $Lr_{max}$ among the threads of the application Apr assigned previously is greater than or equal to the highest load $Lk_{max}$ among the threads of the new application APk. The highest load $Lr_{max}$ among the threads of the application Apr previously assigned is, for example, identified from the first response notification list 500.

Here, if the highest load $Lr_{max}$ is greater than or equal to the highest load $Lk_{max}$, the determining unit 404 refers to the first response notification list 500 and calculates the CPU count X by counting the CPU information records in which the value of the assignment flag is "0". The determining unit 404 then determines if the calculated CPU count X is greater than or equal to the thread count mk of the threads included in the application APk.

Thus, the first determination process can be performed without broadcasting to the CPUs #2 to #N, the lowest load $Lk_{min}$ and the highest load $Lk_{max}$ among the threads of the application APk.

However, if the highest load $Lr_{max}$ is less than the highest load $Lk_{max}$, the lowest load $Lk_{min}$ and the highest load $Lk_{max}$ among the threads of the application APk are broadcast to the CPUs #2 to #N by the notifying unit 403. Similarly, if the CPU count X is less than the thread count mk, the lowest load $Lk_{min}$ and the highest load $Lk_{max}$ among the threads of the application APk are broadcast to the CPUs #2 to #N by the notifying unit 403.

Next, an example of a functional configuration of the slave CPUs (CPUs #2 to #N) will be described. FIG. 8 is a functional diagram of the slave CPUs according to the embodiment. As depicted in FIG. 8, each slave CPU includes a receiving unit 801, a determining unit 802, and a notifying unit 803. Functions of the units (the receiving unit 801 to the notifying unit 803) are, for example, implemented by executing on the CPUs #2 to #N, a program stored in the memory 101. Process results of the functional units are, for example, stored to a storage device such as the respective registers of the CPUs #2 to #N, the primary caches 201-2 to 201-N, the secondary cache 203, and the memory 101.

The receiving unit 801 receives from the CPU #1, a threshold related to the CPU computing capacity for executing an application APk. For example, the receiving unit 801 receives from the CPU #1, the lowest load $Lk_{min}$ and the highest load $Lk_{max}$ among the threads of the application APk.

The determining unit 802 determines if the computing capacity of the CPU thereof is greater than or equal to the received threshold that is related to the CPU computing capacity for executing the application APk. For example, the determining unit 802 determines if the surplus computing capacity of the CPU thereof is greater than or equal to the highest load $Lk_{max}$ among the threads of the application APk. Further, the determining unit 802 determines if the surplus computing capacity of the CPU thereof is greater than or equal to the lowest load $Lk_{min}$ among the threads of the application APk.

The notifying unit 803 notifies the CPU #1 that the application APk can be executed, if the computing capacity of the CPU of the notifying unit 803 is greater than or equal to the threshold related to the CPU computing capacity for executing the application APk. For example, if the surplus computing capacity of the CPU is greater than or equal to the highest load $Lk_{max}$, the notifying unit 803 gives a first response notification to the CPU #1.

Further, if the surplus computing capacity of the CPU is greater than or equal to the lowest load $Lk_{min}$, the notifying unit 803 gives a second response notification to the CPU #1. In this case, the notifying unit 803 may send a second response notification that includes the surplus computing capacity of the CPU to the CPU #1.

Next, a procedure of an assignment process by the master CPU (CPU #1) will be described. Here, a procedure of an assignment process combining the scheduling method 1 and the scheduling method 2 will be described.

Figure 9:
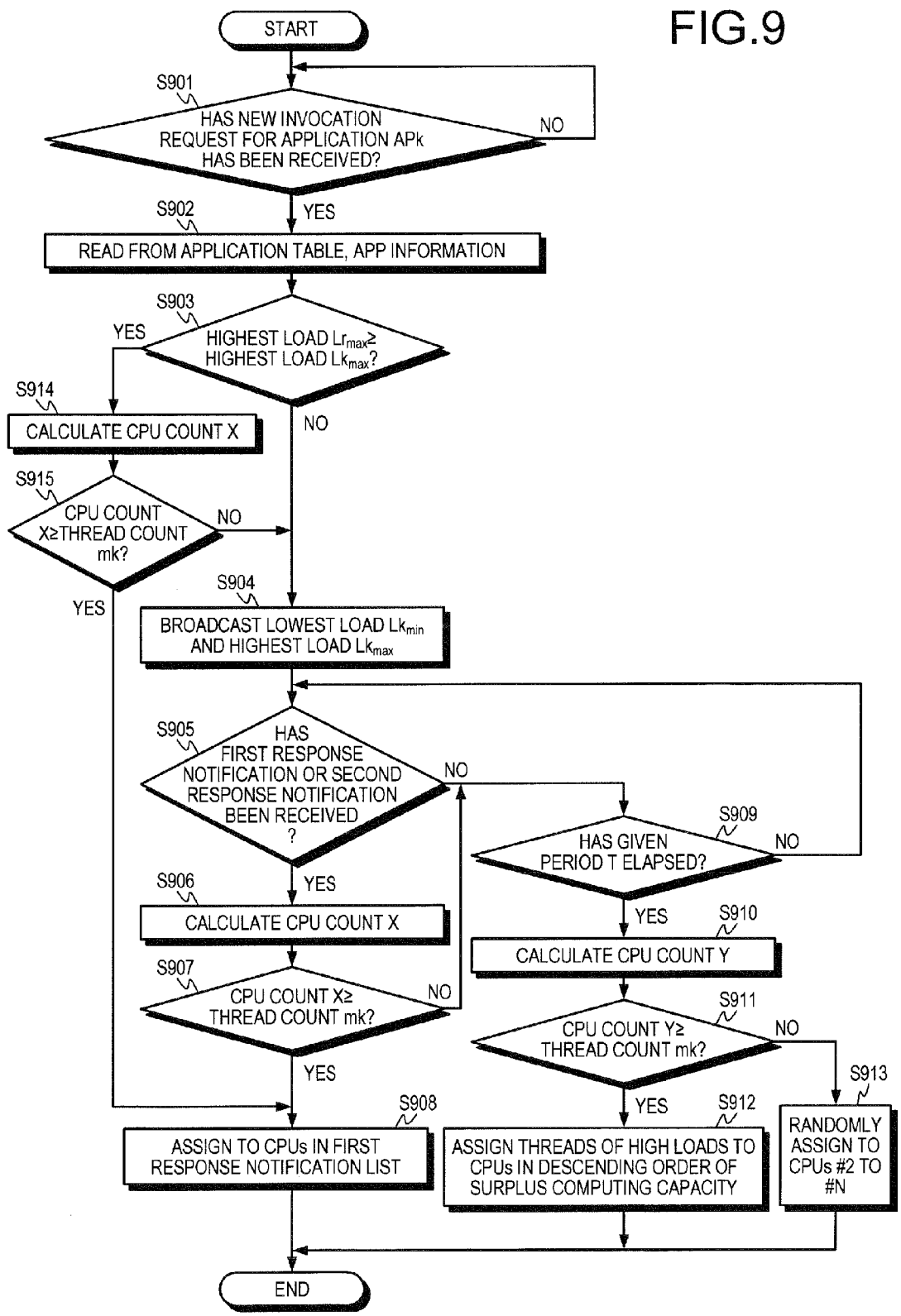
FIG. 9 is a flowchart of a procedure of an assignment process by the master CPU according to embodiment.

FIG. 9 is a flowchart of a procedure of an assignment process by the master CPU (CPU #1) according to embodiment. In the flowchart depicted in FIG. 9, the CPU #1 determines whether a new invocation request for an application APk has been received (step S901). Here, the CPU #1 awaits the receipt of an invocation request (step S901: NO).

Upon receiving an invocation request (step S901: YES), the CPU #1 reads from the application table 300, an app information record 300-k that corresponds to the app ID that is for the application APk and included in the invocation request (step S902).

The CPU #1 refers to the first response notification list 500, and determines if the highest load $Lr_{max}$ among the threads of an application Apr previously assigned is greater than or equal to the highest load $Lk_{max}$ among the threads of the new application APk (step S903).

If the highest load $Lr_{max}$ is less than the highest load $Lk_{max}$ (step S903: NO), the CPU #1 broadcasts to the CPUs #2 to #N, the lowest load $Lk_{min}$ and the highest load $Lk_{max}$ among the threads of the application APk (step S904). The lowest load $Lk_{min}$ and the highest load $Lk_{max}$ among the threads are identified from the app information record 300-k readout at step S902.

The CPU #1 determines if a first response notification or a second response notification has been received from a CPU #j (step S905). If neither a first response notification nor a second response notification has been received (step S905: NO), the CPU #1 transitions to step S909.

On the other hand, if a first response notification or a second response notification has been received (step S905: YES), the CPU #1 calculates the CPU count X of the CPUs from which there is a first response notification, by counting in the first response notification list 500, the CPU information records in which the value of the assignment flag is "0" (step S906). The CPU #1 determines if the calculated CPU count X is greater than or equal to the thread count mk of the threads included in the application APk (step S907).

If the CPU count X is greater than or equal to the thread count mk (step S907: YES), the CPU #1 randomly assigns to the CPUs whose assignment flag in the first response notification list 500 is "0", a thread group of the application APk (step S908), ending a series of operations according to the flowchart.

At step S907, if the CPU count X is less than the thread count mk (step S907: NO), the CPU #1 determines whether the given period T has elapsed since the broadcasting of the lowest load $Lk_{min}$ and the highest load $Lk_{max}$ (step S909). If the given period T has not elapsed (step S909: NO), the CPU #1 returns to step S905.

On the other hand, if the given period T has elapsed (step S909: YES), the CPU #1 calculates the CPU count Y of the CPUs from which there is a second response notification, by counting the CPU information records in the second response notification list 600 (step S910). The CPU #1 determines if the calculated CPU count Y is greater than or equal to the thread count mk of the threads included in the application APk (step S911).

If the CPU count Y is greater than or equal to the thread count mk (step S911: YES), the CPU #1 assigns threads of high loads to the CPUs in descending order of the surplus computing capacities indicated in the second response notification list 600 (step S912), ending a series of operations according to the flowchart.

On the other hand, if the CPU count Y is less than the thread count mk (step S911: NO), the CPU #1 randomly assigns the thread group of the application APk to the CPUs #2 to #N (step S913), ending a series of operations according to the flowchart.

At step S903, if the highest load $Lr_{max}$ is greater than or equal to the highest load $Lk_{max}$ (step S903: YES), the CPU #1 counts in the first response notification list 500, the CPU information records in which the value of the assignment flag is "0" and calculates the CPU count X (step S914).

The CPU #1 determines if the calculated CPU count X is greater than or equal to the thread count mk of the threads included in the application APk (step S915). If the CPU count X is greater than or equal to the thread count mk (step S915: YES), the CPU #1 transitions to step S908. On the other hand, if the CPU count X is less than the thread count mk (step S915: NO), the CPU #1 transitions to step S904.

Thus, a CPU #j from which there is a first response notification can be preferentially selected from among the CPUs #2 to #N, and a thread of the application APk can be assigned thereto. Furthermore, a CPU #j from which there is a second response notification can be preferentially selected from among the CPUs #2 to #N, and a thread of the application APk can be assigned thereto.

At step S903, if no previously assigned application Apr is present, the CPU #1 transitions to step S904.

Next, a procedure of a determination process by the slave CPUs (CPUs #2 to #N) will be described. Here, a procedure of a determination process by the slave CPUs will be described taking a CPU #j among the CPUs #2 to #N as an example.

Figure 10:
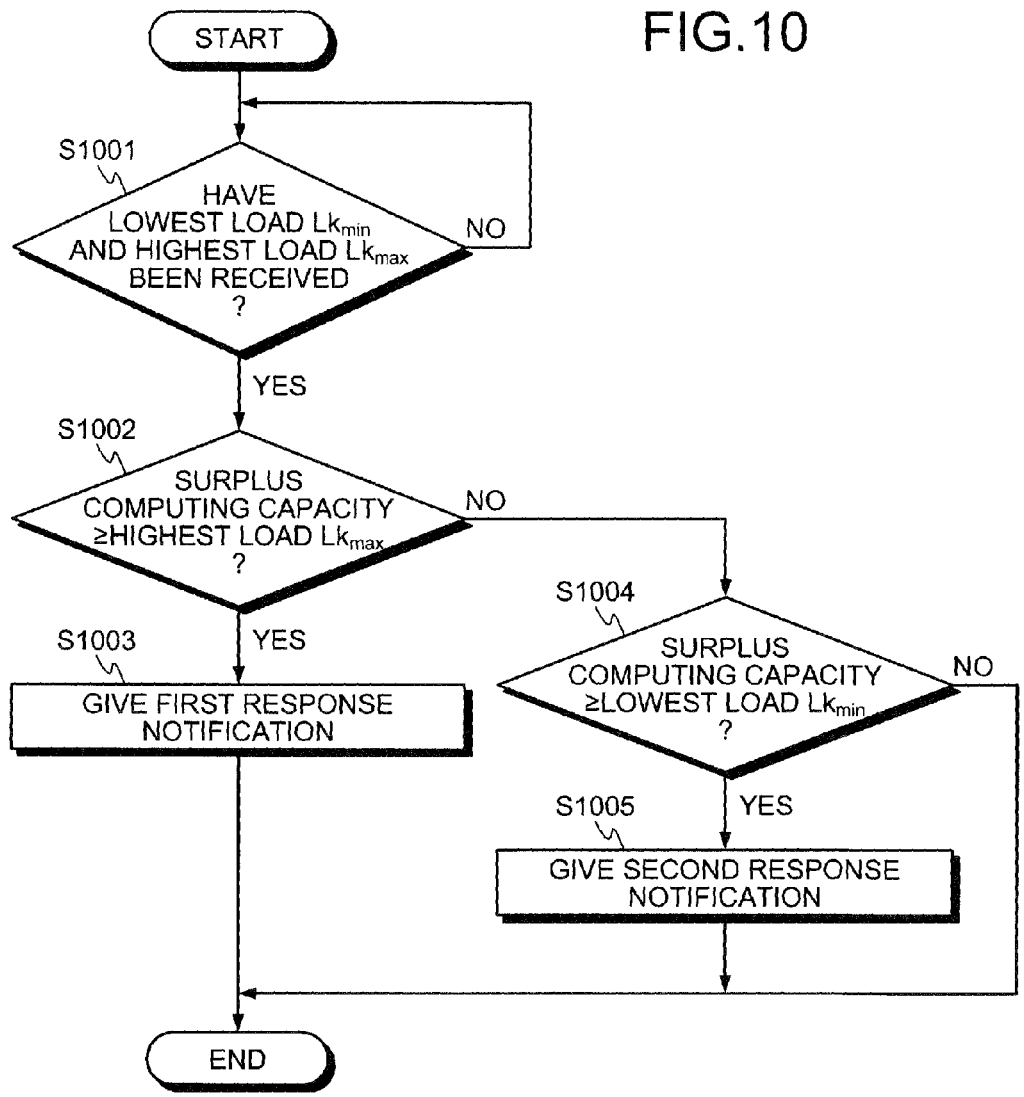
FIG. 10 is a flowchart of an example of a procedure of a determination process executed by the slave CPUs according to the embodiment.

FIG. 10 is a flowchart of an example of a procedure of a determination process executed by the slave CPUs according to the embodiment. In the flowchart depicted in FIG. 10, the CPU #j determines whether the lowest load $Lk_{min}$ and the highest load $Lk_{max}$ among threads of the application APk have been received from the CPU #1 (step S1001).

Here, the CPU #j awaits the receipt of the lowest load $Lk_{min}$ and the highest load $Lk_{max}$ (step S1001: NO). Upon receiving the lowest load $Lk_{min}$ and the highest load $Lk_{max}$ (step S1001: YES), the CPU #j determines if the surplus computing capacity thereof is greater than or equal to the highest load $Lk_{max}$ among the threads of the application APk (step S1002).

If the surplus computing capacity is greater than or equal to the highest load $Lk_{max}$ (step S1002: YES), the CPU #j gives a first response notification to the CPU #1 (step S1003), ending a series of operations according to the flowchart.

On the other hand, if the surplus computing capacity is less than the highest load $Lk_{max}$ (step S1002: NO), the CPU #j determines if the surplus computing capacity thereof is greater than or equal to the lowest load $Lk_{min}$ among the threads of the application APk (step S1004).

If the surplus computing capacity is greater than or equal to the lowest load $Lk_{min}$ (step S1004: YES), the CPU #j gives a second response notification to the CPU #1 (step S1005), ending a series of operations according to the flowchart. On the other hand, if the surplus computing capacity is less than the lowest load $Lk_{min}$ (step S1004: NO), the series of operations according to the flowchart end.

Thus, if the surplus computing capacity is greater than or equal to the highest load $Lk_{max}$, a first response notification can be given to the CPU #1. Further, if the surplus computing capacity is greater than or equal to the lowest load $Lk_{min}$, a second response notification can be given to the CPU #1.

According to the multi-core system 100 of the embodiment described a CPU #j can be notified of the highest load $Lk_{max}$ among the threads of the application APk by the CPU #1, and whether the thread having the highest load $Lk_{max}$ can be executed by the CPU #j can be determined. According to the multi-core system 100, a CPU #j from which there is a first response notification can be preferentially selected from among the CPUs #2 to #N, and a thread of the application APk can be to be assigned thereto. Thus, a thread of the application APk can be assigned to a CPU #j whose surplus computing capacity is greater than or equal to the highest load $Lk_{max}$.

According to the multi-core system 100, a CPU #j can be notified of the lowest load $Lk_{min}$ among the threads of the application APk by the CPU #1, and whether the thread having the lowest load $Lk_{min}$ can be executed by the CPU #j can be determined. According to the multi-core system 100, a CPU #j from which there is a second response notification can be preferentially selected from among the CPUs #2 to #N, and a thread of the application APk can be assigned thereto. Thus, a thread of the application APk can be assigned to a CPU #j whose surplus computing capacity is greater than or equal to the lowest load $Lk_{min}$.

According to the multi-core system 100, first, a CPU from which there is a first response notification can be selected and a thread of the application APk can be assigned thereto; and subsequently, a CPU from which there is a second response notification can be selected and a remaining thread can be assigned thereto. Thus, as far as possible, threads of the application APk can be assigned to a CPU #j whose surplus computing capacity is high and proper load distribution can be facilitated.

According to the multi-core system 100, proper load distribution can be facilitated by assigning as far as possible, threads of high loads to a CPU #j whose surplus computing capacity is high.

According to the multi-core system 100, a CPU #j can be preferentially selected and a thread of the application APk can be assigned thereto, the CPU #j being a CPU from which there is a first response notification indicating that the thread having the highest load $Lr_{max}$ in an application Apr previously assigned can be executed. In this case, if the highest load $Lr_{max}$ of the application Apr is greater than or equal to the highest load $Lk_{max}$ of the application APk, the CPU #1 preferentially selects a CPU #j from which there is a previous first response notification. Thus, the a CPU #j whose surplus computing capacity is greater than or equal to the highest load $Lk_{max}$ can be selected without broadcasting the highest load $Lk_{max}$ of the application APk, and communication costs (communication volume, communication processing) can be reduced.

Thus, according to the scheduling method and scheduling system, the scheduling of a newly invoked application can be performed efficiently. As a result, the processing time and the communication time consumed for scheduling can be prevented from becoming a performance bottleneck, enabling increased performance of the scheduling system.

The scheduling method described in the present embodiment may be implemented by executing a prepared program on a computer such as a personal computer and a workstation.

The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method executed by a first CPU and at least one second CPU, the scheduling method comprising:
   acquiring by the first CPU and when a first application is invoked, a first threshold for executing the first application;
   transmitting by the first CPU, the first threshold to the at least one second CPU when the first threshold is greater than or equal to a second threshold for executing another application acquired when the another application that was assigned before the first application is invoked; and
   giving notification to the first CPU by the at least one second CPU when an execution capability of the at least one second CPU is greater than or equal to the first threshold, the notification indicating that the at least one second CPU can execute the first application, wherein
   the at least one second CPU does not give notification to the first CPU when the execution capability of the at least one second CPU is less than the first threshold, and
   the first CPU performs assigning the first application randomly to CPUs when the first threshold is not transmitted to the at least one second CPU.

2. The scheduling method according to claim 1, wherein
   the transmitting by the first CPU includes transmitting the first threshold to the at least one second CPU when a count of CPUs having an execution capability that is greater than or equal to the first threshold is less than a count of threads generated by the first application.

3. The scheduling method according to claim 1, further comprising
   acquiring by the first CPU a third threshold that is smaller than the first threshold for executing the first application when the first application is invoked and
   comparing by the first CPU, the execution capability of the at least one second CPU and the third threshold, when the execution capability is less than the first threshold wherein
   the giving notification by the at least one second CPU includes giving to the first CPU, the notification indicating that the first application can be executed, when the execution capability of the at least one second CPU is greater than the first threshold, and
   the at least one second CPU giving another notification to the first CPU, the another notification indicating that the at least one second CPU executes the first application when the execution capability of the at least one second CPU is greater than or equal to the third threshold.

4. The scheduling method according to claim 3, wherein
   the first threshold corresponds to a largest capability needed for executing the first application, and
   the third threshold corresponds to a smallest capability needed for executing the first application.

5. The scheduling method according to claim 3, further comprising
   assigning by the first CPU, the first application to a CPU having a large execution capability among third CPUs, the assigning being performed after a given interval has elapsed since notification of the first threshold and when a count of the third CPUs among the at least one second CPU having an execution capability that is greater than or equal to the third threshold is greater than or equal to a count of threads generated by the first application.

6. The scheduling method according to claim 3, further comprising
   assigning the first application randomly to CPUs, when a count of third CPUs among the at least one second CPU having an execution capability that is greater than or equal to the third threshold is less than a count of threads generated by the first application, the assigning being performed by the first CPU.

7. A scheduling system comprising:
   memory that stores a first threshold for executing a first application;
   a first CPU that acquires the first threshold when the first application is invoked; and
   at least one second CPU that when an execution capability of the at least one second CPU is greater than or equal to the first threshold provided by the first CPU, gives to the first CPU, notification indicating that the first application can be executed, and when the execution capability is less than the first threshold, gives no notification to the first CPU,
   wherein the first CPU transmits the first threshold to the at least one second CPU, when the first threshold is greater than or equal to a second threshold for executing another application acquired when the another application that was assigned before the first application is invoked, and
   the first CPU assigns the first application randomly to CPUs when the first threshold is not transmitted to the at least one second CPU.

8. The scheduling system according to claim 7, wherein
   the first CPU transmits the first threshold to the at least one second CPU, when a count of CPUs having an execution capability that is greater than or equal to the first threshold is less than a count of threads generated by the first application.

9. The scheduling system according to claim 7, wherein
   the first CPU acquires a third threshold that is smaller than the first threshold for executing the first application when the first application is invoked and when the execution capability of the at least one second CPU is less than the first threshold, compares the execution capability to the third threshold,
   the at least one second CPU, giving to the first CPU the notification indicating that the first application can be executed when the execution capability of the at least one second CPU is greater than the first threshold, and giving to the first CPU another notification indicating that the at least one second CPU executes the first application when the execution capability of the at least one second CPU is greater than or equal to the third threshold.

* * * * *